(12) United States Patent
Cariou et al.

(10) Patent No.: US 10,701,688 B2
(45) Date of Patent: Jun. 30, 2020

(54) DYNAMIC CHANNEL BONDING AND MULTI-BAND AGGREGATION

(71) Applicants: Intel Corporation, Santa Clara, CA (US); Intel IP Corporation, Santa Clara, CA (US)

(72) Inventors: Laurent Cariou, Portland, OR (US); Xiaogang Chen, Portland, OR (US); Feng Jiang, Santa Clara, CA (US); Thomas J. Kenney, Portland, OR (US); Qinghua Li, San Ramon, CA (US); Alexander Min, Portland, OR (US); Rath Vannithamby, Portland, OR (US)

(73) Assignees: Intel Corporation, Santa Clara, CA (US); Intel IP Corporation, Santa Clara, CA (US)

( * ) Notice: Subject to any disclaimer, the term of this patent is extended or adjusted under 35 U.S.C. 154(b) by 114 days.

(21) Appl. No.: 16/128,388

(22) Filed: Sep. 11, 2018

(65) Prior Publication Data
US 2019/0045508 A1 Feb. 7, 2019

Related U.S. Application Data

(60) Provisional application No. 62/556,951, filed on Sep. 11, 2017, provisional application No. 62/599,569, filed on Dec. 15, 2017.

(51) Int. Cl.
*H04W 72/04* (2009.01)
*H04L 5/00* (2006.01)
*H04W 84/12* (2009.01)

(52) U.S. Cl.
CPC ........ *H04W 72/0446* (2013.01); *H04L 5/001* (2013.01); *H04L 5/0007* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2007/0153757 A1* | 7/2007 | Kim | H04L 1/1614 370/338 |
| 2014/0064101 A1* | 3/2014 | Hart | H04W 74/0808 370/241 |
| 2016/0269296 A1* | 9/2016 | Abraham | H04W 28/065 |
| 2017/0367118 A1* | 12/2017 | Choi | H04W 74/0816 |

* cited by examiner

*Primary Examiner* — Brandon M Renner
(74) *Attorney, Agent, or Firm* — Eversheds Sutherland (US) LLP

(57) ABSTRACT

This disclosure describes systems, methods, and devices related to dynamic channel bonding and multi-band aggregation. A device may determine a plurality of aggregated medium access control (MAC) protocol data unit (A-MPDU) subframes to send to a station device including a first A-MPDU subframe and a second A-MPDU subframe. The device may determine a quiet period between the first A-MPDU subframe and the second A-MPDU subframe. The device may cause to send the plurality of A-MPDU subframes to the station device on a first channel. The device may determine a status of a second channel during the quiet period. The device may cause to send the second A-MPDU subframe to the station device using a multi-band transmission on the first channel and the second channel.

20 Claims, 12 Drawing Sheets

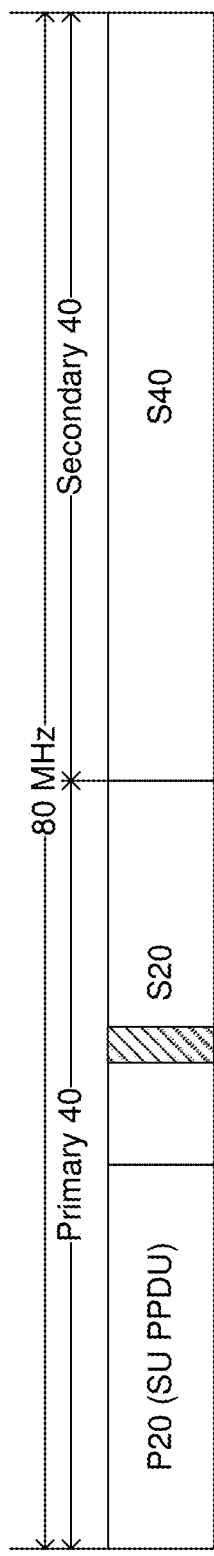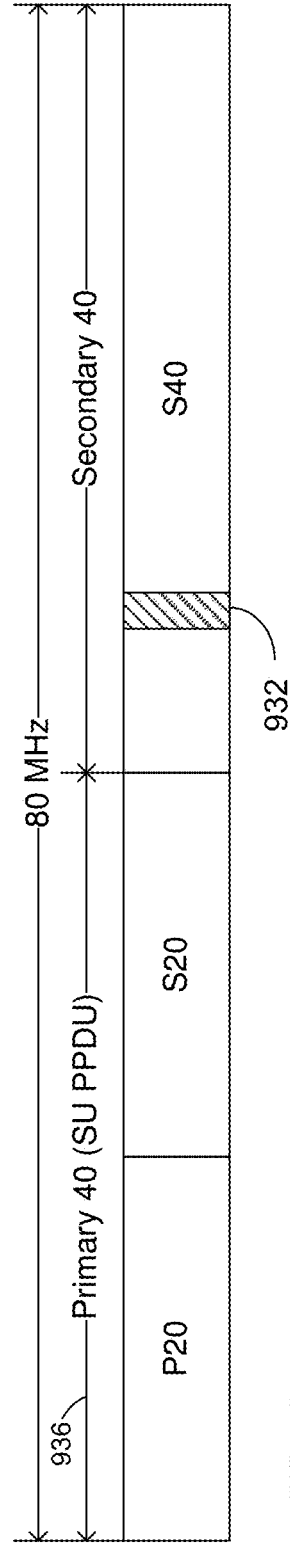
FIG. 9A
FIG. 9B

DYNAMIC CHANNEL BONDING AND MULTI-BAND AGGREGATION

CROSS REFERENCE

This application claims the benefit of U.S. Provisional Application 62/556,951, filed Sep. 11, 2017, and U.S. Provisional Application 62/599,569, filed Dec. 15, 2017, the disclosures of which are incorporated herein by reference as if set forth in full.

TECHNICAL FIELD

This disclosure generally relates to systems and methods for wireless communications and, more particularly, to dynamic channel bonding and multi-band aggregation.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 9A-9B depict illustrative schematic diagrams for usable band for single user (SU) physical layer convergence protocol data unit (PPDU), in accordance with one or more example embodiments of the present disclosure.

DETAILED DESCRIPTION

Figure 1:
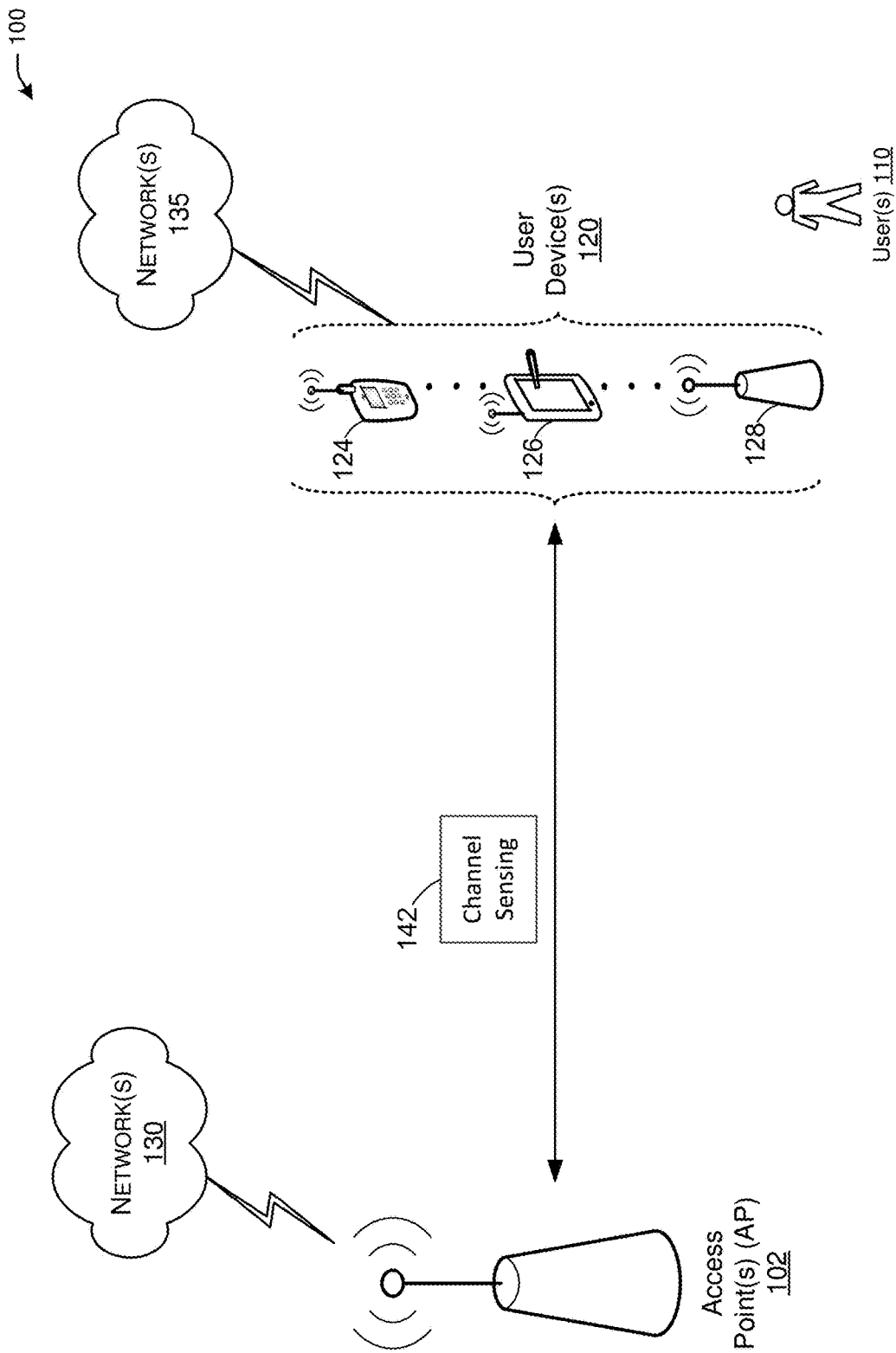
FIG. 1 is a network diagram illustrating an example network environment for dynamic channel bonding and multi-band aggregation, in accordance with one or more example embodiments of the present disclosure.

Example embodiments described herein provide certain systems, methods, and devices for dynamic channel bonding and multi-band aggregation and for enhanced physical layer (PHY) for 6 GHz disabled band. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A dynamic channel bonding technique may allow the transmitter to change the transmission bandwidth in the middle of a physical layer convergence protocol (PLCP) protocol data unit (PPDU) transmission. A transmitter may begin a transmission of data to a receiving device on a first channel of a first band that comprises a first channel bandwidth. The transmitter may determine the transmission channel bandwidth (e.g., 20 MHz, 40 MHz, 80 MHz, or the like) at the beginning of the transmission. For example, a transmitter may sense one or more secondary channels during the point coordination function interframe space (PIFS) that immediately precedes an expiration of a backoff of the transmitter. Once the transmitter determines the transmission bandwidth, the transmitter may use the same bandwidth for the entire PPDU transmission. For example, a transmitter that is configured to send a PPDU may sense one or more secondary channels and determine that interference exists on the one or more secondary channels. As a result, the transmitter may begin a transmission of the PPDU on a primary channel of the band. The primary channel may comprise a particular bandwidth on the band (e.g., 20 MHz of a 5 GHz band), which may be used for the duration of the PPDU transmission. This static channel access behavior may restrict the use of secondary channels (e.g., the use of secondary channels via channel bonding and/or multi-band aggregation) in the presence of overlapping basic service set (OBSS) signals in the secondary channels, causing a waste of spectrum resources. It may be desired to increase the bandwidth of a PPDU transmission after the transmission has begun.

Previous systems have addressed this problem by enabling simultaneous transmission and reception (sensing) using self-interference cancellation (SIC) techniques in antenna, analog, and digital baseband circuitry. However, the SIC-based dynamic channel bonding requires hardware modification, including a special type of antenna that supports high isolation between the transmitter and the receiver. The SIC-based dynamic channel bonding also requires SIC algorithms in analog/digital domains, for example in order to enable adjacent channel sensing (e.g., sensing one or more secondary channels) while transmitting a PPDU on the current operating channel (e.g., on the primary channel). Solutions that allow for increasing the bandwidth of a PPDU transmission after the transmission has begun that do not require hardware modification are desired.

There is currently a desire to open a new band for unlicensed operation between 6 GHz and 7 GHz. A 2-step approach to introduce Wi-Fi in that band is introduced.

In order to push the regulator to open up the 6 GHz band operation for Wi-Fi, companies agreed to enable 802.11ax devices to work on 6 GHz band to demonstrate the product support. A key difference between 6 GHz band and the legacy Wi-Fi systems is the incumbent service in 6 GHz, which brings narrow or wide band notching in this band. The current 802.11ax, operates in 2.4 GHz/5 GHz band, did not consider such notching in the standard development. Some modifications are necessary for the flax to smoothly migrate to the 6 GHz band.

One or more changes may be needed to the 802.11ax specification given that 802.11ax could potentially work in 6 GHz in the next-generation Wi-Fi. However, some bands are not available for Wi-Fi due to the incumbent services such as satellite, wireless backhaul used by operator, etc.

It may be possible to indicate the disabled subchannel in a beacon such that both an access point (AP) and a station device (STA) will acknowledge the usable bands.

However, if the idea of disabled band is applied to single user (SU) PPDU that means discontinuous resource allocation will be applied to 802.11ax. Further, there is no consideration for out of band (OOB) emission.

Example embodiments of the present disclosure relate to systems, methods, and devices for dynamic channel bonding and multi-band aggregation.

In one embodiment, a dynamic channel bonding and multi-band aggregation system may define one or more mechanisms to allow the transmitter to sense one or more secondary channels and enable asynchronous channel bonding in the middle of on-going PPDU transmissions. The proposed methods can be also used to sense channels on different frequency bands to enable asynchronous multi-band aggregation (e.g., non-contiguous channels on 5 GHz and 6 GHz bands), for example for next-gen Wi-Fi.

In one embodiment, a dynamic channel bonding and multi-band aggregation system may introduce one or more quiet periods after a PPDU transmission has begun (e.g., at the end of an aggregated media access layer protocol data unit (A-MPDU) subframe or once every N orthogonal frequency-division multiplexing (OFDM) symbols, wherein N is a positive integer). The dynamic channel bonding and multi-band aggregation system may sense one or more secondary channels during the one or more quiet periods. Based on a measurement of the one or more secondary channels during the quiet period, the dynamic channel bonding and multi-band aggregation system may determine a status of a secondary channel. For example, the dynamic channel bonding and multi-band aggregation system may determine that the secondary channel is busy or idle based on the measurement during the quiet period.

In one embodiment, a dynamic channel bonding and multi-band aggregation system may determine that the secondary channel is busy during the quiet period. If the dynamic channel bonding and multi-band aggregation system determines that the secondary channel is busy, the dynamic channel bonding and multi-band aggregation system may continue to transmit the PPDU to the receiver on the primary channel. During the next quiet period, the dynamic channel bonding and multi-band aggregation system may again determine a status of the secondary channel.

In one embodiment, a dynamic channel bonding and multi-band aggregation system may determine that the secondary channel is idle during the quiet period. If the dynamic channel bonding and multi-band aggregation system determines that the secondary channel is idle, the dynamic channel bonding and multi-band aggregation system may determine to begin transmitting the PPDU on a wider channel (e.g., on the primary channel and on the secondary channel). For example, the dynamic channel bonding and multi-band aggregation system may determine to perform one or more of channel bonding or multi-band aggregation (e.g., depending on whether the secondary channel is within the same band as the primary channel) in order to increase the bandwidth of the remainder of the PPDU transmission. The dynamic channel bonding and multi-band aggregation system may allow the transmitter to sense secondary channels while transmitting, thus allowing an "asynchronous" dynamic channel bonding to better utilize available spectrum resources without needing to have special high-isolation antenna or implement complex SIC algorithms in analog/digital baseband circuitry. The puncturing (or quiet time) approach may be used to enable asynchronous multi-band aggregation in next-generation Wi-Fi systems. The proposed quiet periods may be used to sense other channel(s) in different band(s), e.g., sensing channels on 6 GHz band while transmitting on channels on 5 GHz band, with higher accuracy because there could be still residual self-interference or leakage even between two different bands (e.g., 5 and 6 GHz bands).

In one embodiment, a dynamic channel bonding and multi-band aggregation system may introduce a quiet period at the end of one or more A-MPDU subframes. During the quiet periods, the dynamic channel bonding and multi-band aggregation system may perform sensing on one or more secondary channels.

In one embodiment, a dynamic channel bonding and multi-band aggregation system may introduce a quiet period once every N OFDM symbols, wherein N is a positive integer. The dynamic channel bonding and multi-band aggregation system may decide a number (or a frequency) of the quiet periods in addition to the timing of the quiet periods based on one or more factors. For example, the dynamic channel bonding and multi-band aggregation system may consider one or more of a network allocation vector (NAV) setting (if available), a traffic load on the one or more secondary channels, and an indication of the remaining transmission opportunity (TXOP) associated with the remaining PPDU duration.

In one embodiment, a dynamic channel bonding and multi-band aggregation system may, upon the detection of the idleness of the one or more secondary channels (e.g., during the quiet period at the end of the an A-MPDU subframe transmission, decide whether the dynamic channel bonding and multi-band aggregation system will transition to a wider bandwidth transmission. If the dynamic channel bonding and multi-band aggregation system determines that it will transition to a wider bandwidth, the dynamic channel bonding and multi-band aggregation system may indicate the early termination of the current PPDU transmission in the MPDU delimiter of the next A-MPDU subframe.

In one embodiment, a dynamic channel bonding and multi-band aggregation system may use multi-band aggregation to transition to a wider bandwidth. For example, the dynamic channel bonding and multi-band aggregation system may sense the presence and/or absence of a signal on a second band (e.g., on a 6 GHz band) during the quiet periods without worrying about self-interference or leakage from its PPDU transmission on the first band (e.g., on a 5 GHz band). Once the transmitter detects that the channel on 6 GHz band becomes idle, then it can perform carrier sense multiple access with collision avoidance (CSMA/CA) on the 6 GHz band to initiate multi-band aggregated PPDU transmission.

Example embodiments of the present disclosure also relate to systems, methods, and devices for enhanced PHY for 6 GHz disabled band.

In one embodiment, an enhanced PHY for 6 GHz disabled band may facilitate a rule to disable the non-contiguous resource allocation for SU PPDU.

In one embodiment, an enhanced PHY for 6 GHz disabled band may facilitate a rule to include the guard band in the disabled bands.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of dynamic channel bonding and multi-band aggregation, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 11:
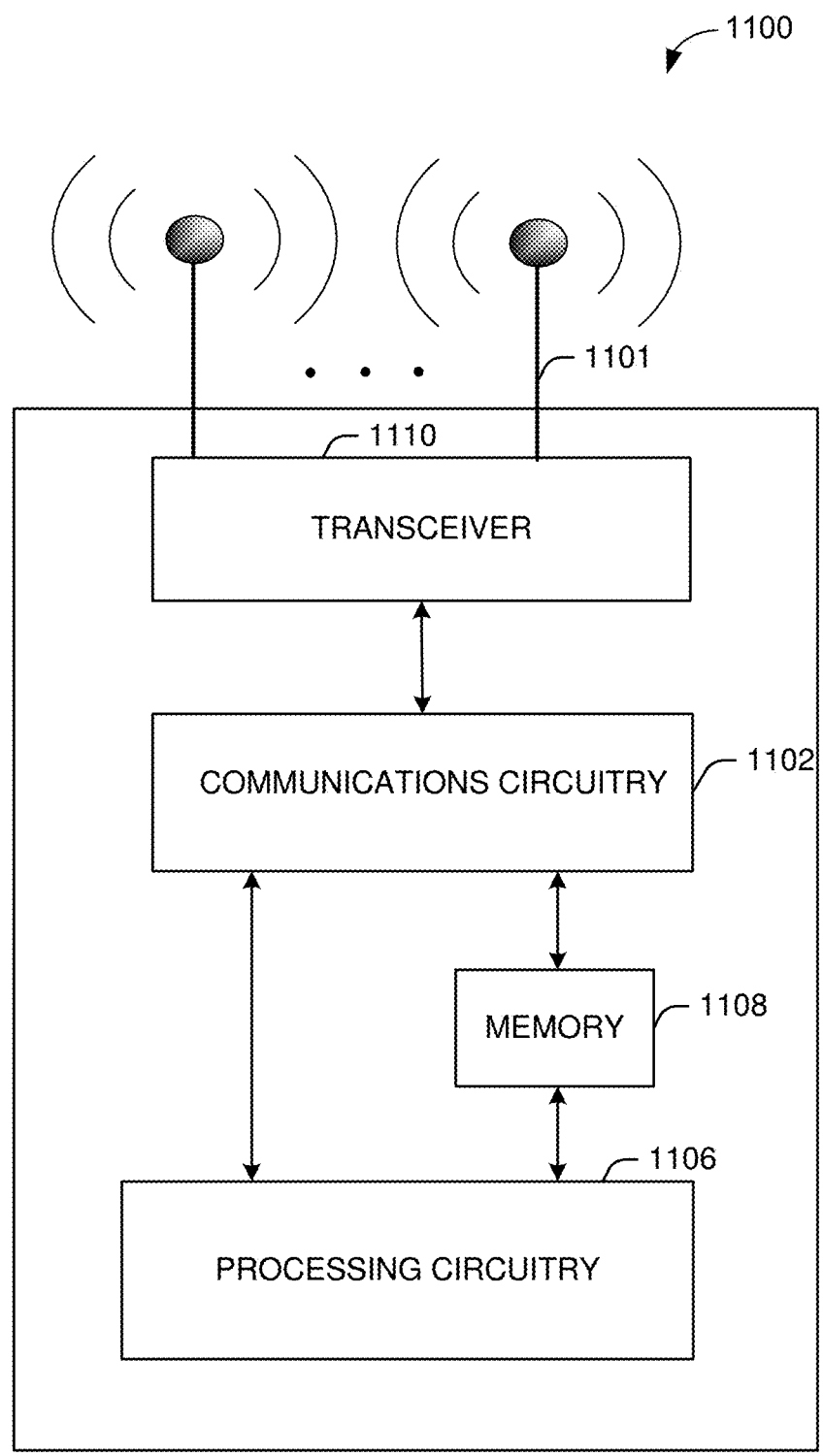
FIG. 11 illustrates a functional diagram of an exemplary communication station that may be suitable for use as a user device, in accordance with one or more example embodiments of the present disclosure.
Figure 12:
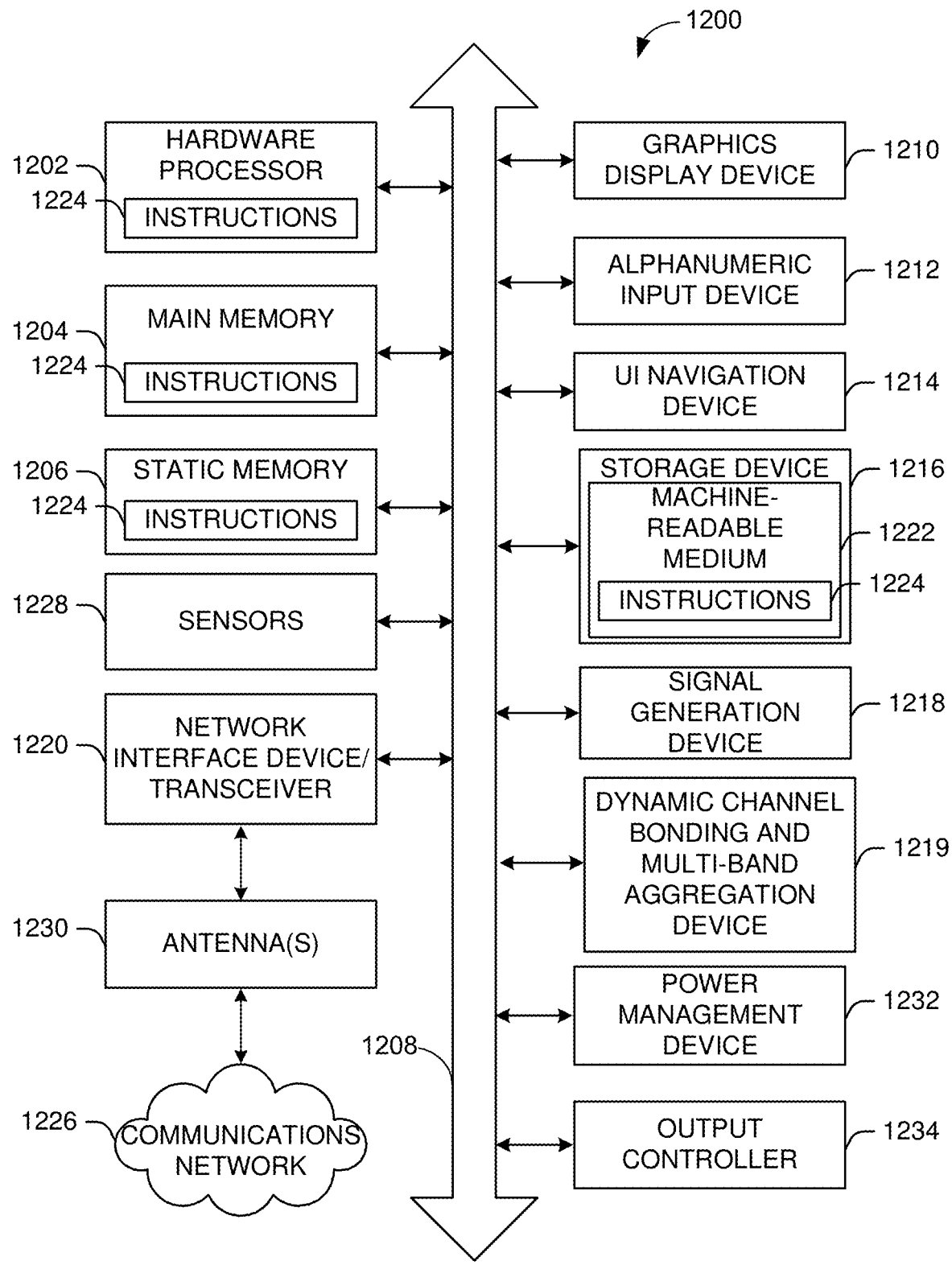
FIG. 12 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 11 and/or the example machine/system of FIG. 12.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120 through one or more channels. In one embodiment, the AP 102 and/or the one or more user devices 120 may perform channel sensing 142. In one embodiment, the AP 102 and the one or more user devices 120 may communicate using a 6 GHz channel in time and frequency domain.

It is understood that the above descriptions are for purposes of illustration and are not meant to be limiting.

Figure 2:
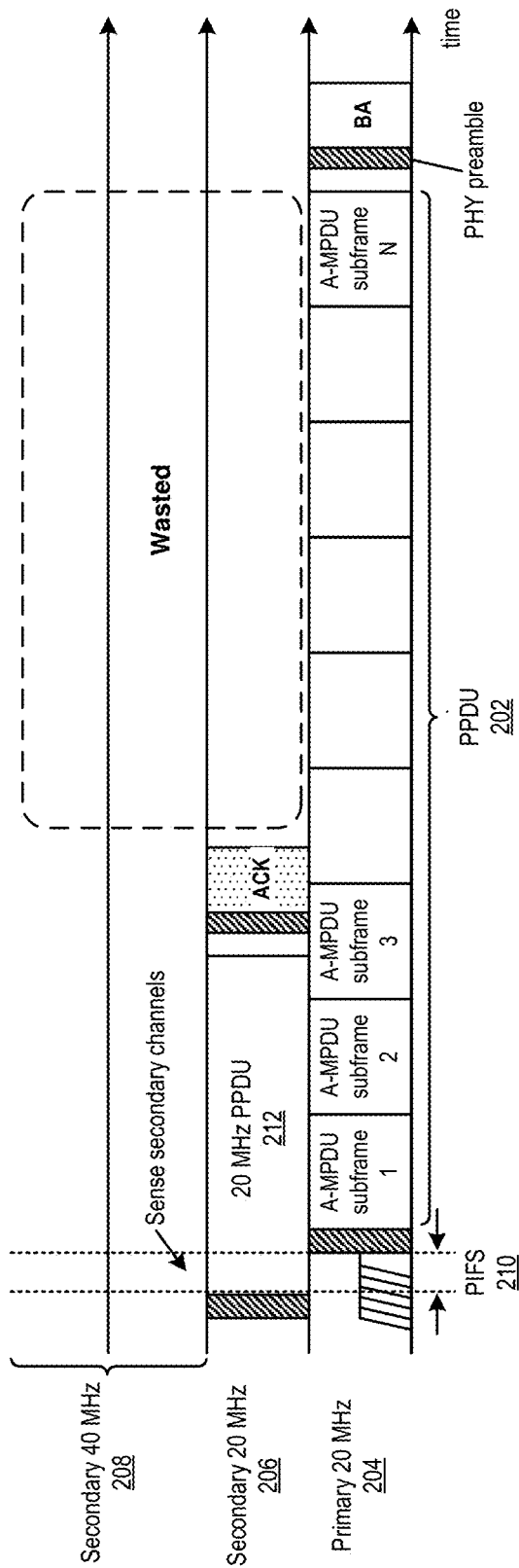
FIG. 2 depicts an illustrative schematic diagram for channel access behavior.

FIG. 2 depicts an illustrative schematic diagram for channel access behavior.

In current 802.11 systems, a transmitter may determine the transmission channel bandwidth (e.g., 20 MHz, 40 MHz, or 80 MHz) at the beginning of a PPDU transmission. A transmitter may begin a transmission of data, such as PPDU 202, to a receiving device on a first channel of a first band that comprises a first channel bandwidth. The first channel may be a primary channel that is 20 MHz wide, such as Primary 20 MHz 204. The first band may also include one or more secondary channels, such as Secondary 20 MHz 206 and/or Secondary 40 MHz 208. The transmitter may determine the transmission channel bandwidth (e.g., 20 MHz, 40 MHz, 80 MHz, or the like) at the beginning of the transmission of the PPDU 202. For example, a transmitter may sense one or more of the secondary channels during the point coordination function interframe space (PIFS) 210 that immediately precedes an expiration of a backoff of the transmitter. Once the transmitter determines the transmission bandwidth, the transmitter may use the same bandwidth for the entire PPDU transmission. For example, a transmitter that is configured to send PPDU 202 may sense one or more of secondary channels 206 and 208 and determine that interference exists on the one or more secondary channels (e.g., the transmitter may sense PPDU 212 on the Secondary 20 MHz channel 206). As a result, the transmitter may begin a transmission of the PPDU 202 on a primary channel 204 of the band. The primary channel may comprise a particular bandwidth on the band (e.g., 20 MHz of a 5 GHz band), which may be used for the duration of the PPDU 202 transmission. The PPDU 202 may comprise an integer number N A-MPDU subframes. The transmitter may send each A-MPDU subframe on the same channel. This static channel access behavior may restrict the use of secondary channels (e.g., the use of secondary channels via channel bonding and/or multi-band aggregation) in the presence of overlapping basic service set (OBSS) signals in the secondary channels, causing a waste of spectrum resources.

It is understood that the above descriptions are for purposes of illustration and are not meant to be limiting.

Figure 3:
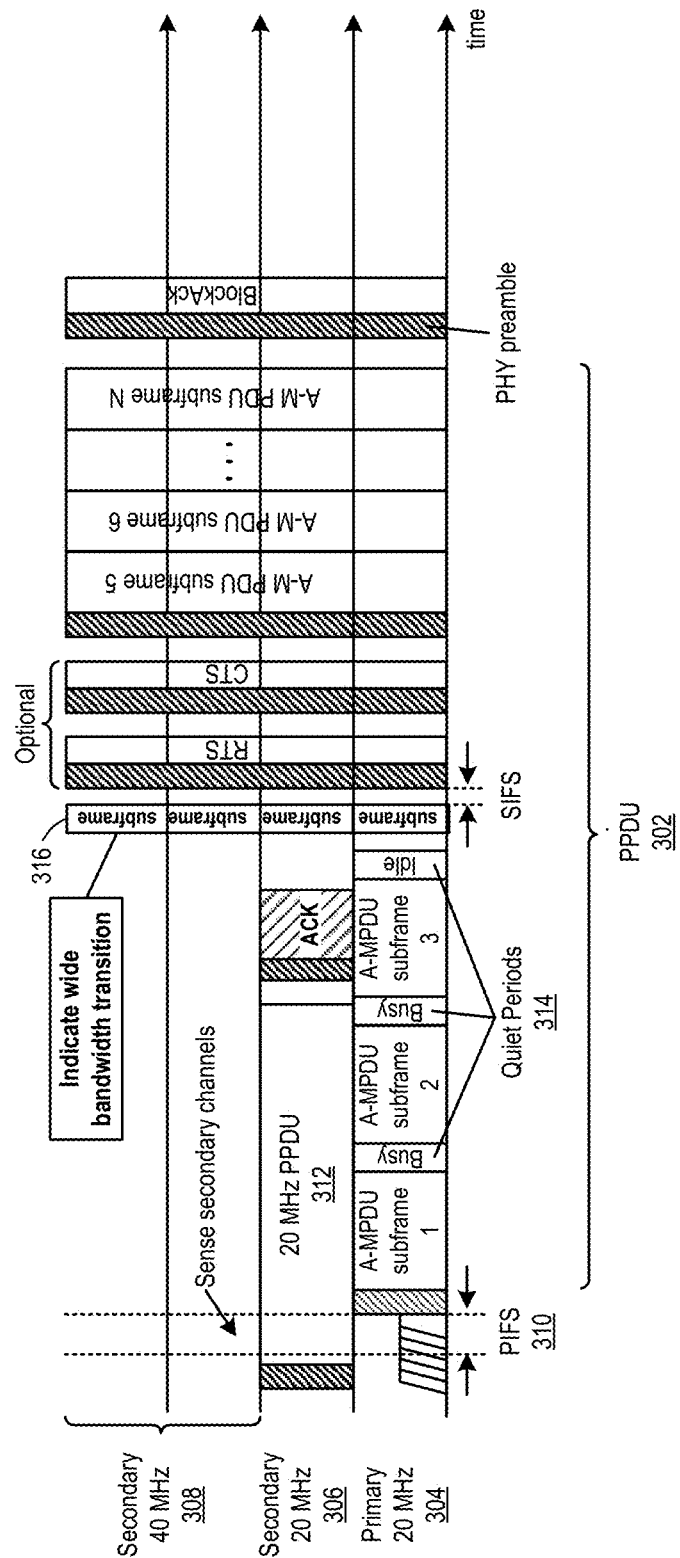
FIG. 3 depicts an illustrative schematic diagram for dynamic channel bonding, in accordance with one or more example embodiments of the present disclosure.

FIG. 3 depicts an illustrative schematic diagram for dynamic channel bonding, in accordance with one or more example embodiments of the present disclosure.

In a dynamic channel bonding and multi-band aggregation system, a transmitter may determine the transmission channel bandwidth (e.g., 20 MHz, 40 MHz, or 80 MHz) during one or more quiet periods through transmission of a PPDU. A transmitter may begin a transmission of data, such as PPDU 302, to a receiving device on a first channel of a first band that comprises a first channel bandwidth. The first channel may be a primary channel that is 20 MHz wide, such as Primary 20 MHz 304. The first band may also include one or more secondary channels, such as Secondary 20 MHz 306 and/or Secondary 40 MHz 308. The transmitter may initially determine the transmission channel bandwidth (e.g., 20 MHz, 40 MHz, 80 MHz, or the like) at the beginning of the transmission of the PPDU 302. For example, a transmitter may sense one or more of the secondary channels during the PIFS 310 that immediately precedes an expiration of a backoff of the transmitter. Once the transmitter determines the initial transmission bandwidth, the transmitter may begin transmission of the PPDU 302 using the initial transmission bandwidth. For example, a transmitter that is configured to send PPDU 302 may sense one or more of secondary channels 306 and 308 and determine that interference exists on the one or more secondary channels (e.g., the transmitter may sense PPDU 312 on the Secondary 20 MHz channel 306). As a result, the transmitter may begin a transmission of the PPDU 302 on a primary channel 304 of the band. The primary channel may comprise a particular bandwidth on the band (e.g., 20 MHz of a 5 GHz band), which may be used at the beginning of the PPDU 302 transmission. The PPDU 302 may comprise an integer number N A-MPDU subframes. The transmitter may send a first number of the N A-MPDU subframes (e.g., a subset of the N A-MPDU subframes) on the primary channel 304.

The dynamic channel bonding and multi-band aggregation system may define one or more mechanisms to allow the transmitter to sense the one or more secondary channels 306 and/or 308 and enable asynchronous channel bonding in the middle of the on-going PPDU 302 transmission.

As illustrated in FIG. 3, a dynamic channel bonding and multi-band aggregation system may introduce one or more quiet periods 314 after the transmission of PPDU 302 has begun. In an illustrated embodiment, the transmitter may sense the one or more secondary channels 306 and/or 308 at the end of an A-MPDU subframe (e.g., at the end of A-MPDU subframe 1, A-MPDU subframe 2, A-MPDU subframe 3, . . . , and/or A-MPDU subframe N).

Alternatively, the one or more quiet periods 314 may be introduced once every M orthogonal frequency-division multiplexing (OFDM) symbols, wherein M is a positive integer. The transmitter may decide a number (or a frequency) of the quiet periods 314 in addition to the timing of the quiet periods 314 based on one or more factors. For example, the transmitter may consider one or more of a network allocation vector (NAV) setting (if available), a traffic load on the one or more secondary channels, and an indication of the remaining transmission opportunity (TXOP) associated with the remaining PPDU 302 duration.

The dynamic channel bonding and multi-band aggregation system may sense the one or more secondary channels 306 and/or 308 during the one or more quiet periods 314. For example, the transmitter may determine that the secondary channel 306 is busy during the quiet periods 314 after A-MPDU subframes 1 and 2, but that secondary channels 306 and 308 are idle during the quiet period 314 after A-MPDU subframe 3. In other words, based on a measurement of the one or more secondary channels 306 and/or 308 during the quiet periods 314, the dynamic channel bonding and multi-band aggregation system may determine a status of the one or more secondary channels 306 and/or 308.

As illustrated in FIG. 3, the transmitter may determine that the secondary channel 306 is busy during the quiet period 314 after A-MPDU subframes 1 and 2. If the transmitter determines that the secondary channel 306 is busy, the transmitter may continue to transmit the PPDU 302 to the receiver on the primary channel 304. During the next quiet period 314, the transmitter may again determine a status of the one or more secondary channels 306 and/or 308.

The transmitter may determine that the secondary channels 306 and 308 are idle during the quiet periods 314 after the A-MPDU subframe 3. If the transmitter determines that the secondary channels 306 and/or 308 are idle, the transmitter may determine to begin transmitting the PPDU 302 on a wider channel (e.g., on the primary channel 304 and on the secondary channels 306 and 308). For example, the transmitter may determine to perform channel bonding in order to increase the bandwidth of the remainder of the PPDU 304 transmission. In other words, because the transmitter may sense the secondary channels 306 and/or 308 during transmission of the PPDU 302, the transmitter may perform "asynchronous" dynamic channel bonding to better utilize available spectrum resources without needing to have special high-isolation antenna or implement complex SIC algorithms in analog/digital baseband circuitry.

If the dynamic channel bonding and multi-band aggregation system determines that the transmitter will transition to a wider bandwidth, the transmitter may indicate the early termination of the current PPDU 302 transmission in an MPDU delimiter of the next A-MPDU subframe 316. After a short interframe space (SIFS), the transmitter may optionally send a ready to send (RTS) frame on the wider bandwidth. The receiver may respond with a clear to send (CTS) frame in response to the RTS frame from the transmitter. After the transmitter has determined to send the remainder of the PPDU 302 on the wider bandwidth, the transmitter may begin transmission of the remainder of the PPDU 302 (e.g., the transmitter may begin transmitting the remaining A-MPDU subframes that were not transmitted prior to detecting that the secondary channels 306 and 308 were idle during the quiet period 314 after the A-MPDU subframe 3).

It is understood that the above descriptions are for purposes of illustration and are not meant to be limiting.

Figure 4:
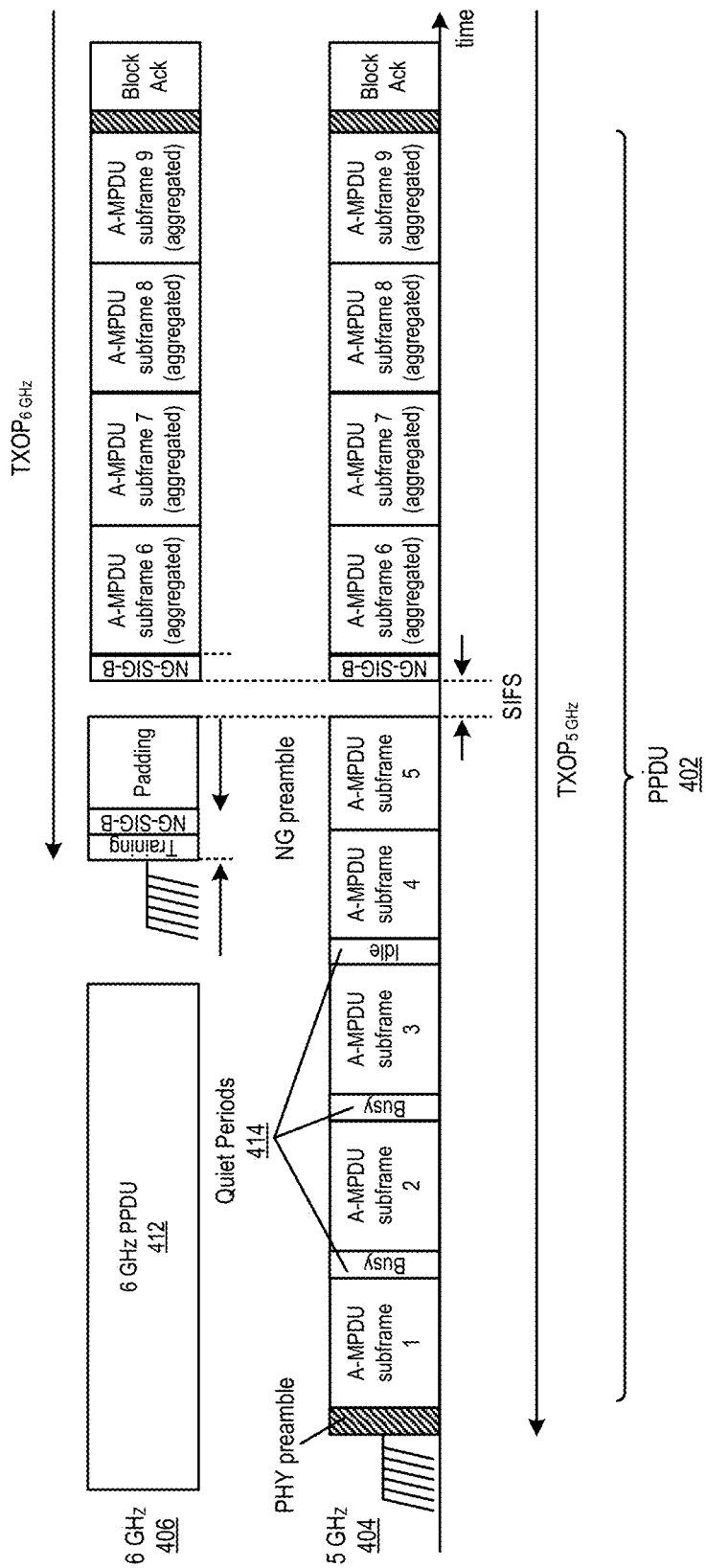
FIG. 4 depicts an illustrative schematic diagram for dynamic multi-band aggregation, in accordance with one or more example embodiments of the present disclosure.

FIG. 4 depicts an illustrative schematic diagram for dynamic multi-band aggregation, in accordance with one or more example embodiments of the present disclosure.

Referring to FIG. 4, there is shown a dynamic multi-band aggregation. As mentioned earlier, the quiet-period-based channel sensing mechanism may be used in multi-band aggregation, as shown in FIG. 4. For example, the transmitter may sense the presence/absence of a signal on a 6 GHz band 406 during the quiet periods 414 without worrying about self-interference or leakage from its PPDU 402 transmission on 5 GHz band 404. Once the transmitter detects that one or more channels on the 6 GHz band 406 becomes idle, the transmitter may perform carrier sense multiple access with collision avoidance (CSMA/CA) on the 6 GHz band 406 to initial multi-band aggregated PPDU transmission.

In one embodiment, a dynamic channel bonding and multi-band aggregation system may facilitate methods to avoid quiet period alignments in multi-AP environments. It should be noted that quiet periods of neighbor APs should not be aligned to avoid false alarm and causing interference to other on-going transmissions. For example, if quiet periods from two or more APs are aligned, then the APs may think the channel is available whereas the other AP is indeed in a brief "quiet time" in the middle of on-going PPDU transmission. To avoid or mitigate this problem, different APs could use different periodicity (e.g., different periodicity may be used if the APs are time synced). Alternatively, the APs may exchange the puncturing info (e.g., information associated with the quiet periods, such as whether this feature is enabled or not and/or what the timing and/or sequence of the quiet periods is, and the like) across the APs via multi-AP coordination protocol in multi-AP SIG.

It is understood that the above descriptions are for purposes of illustration and are not meant to be limiting.

Figures 5A, 5B:
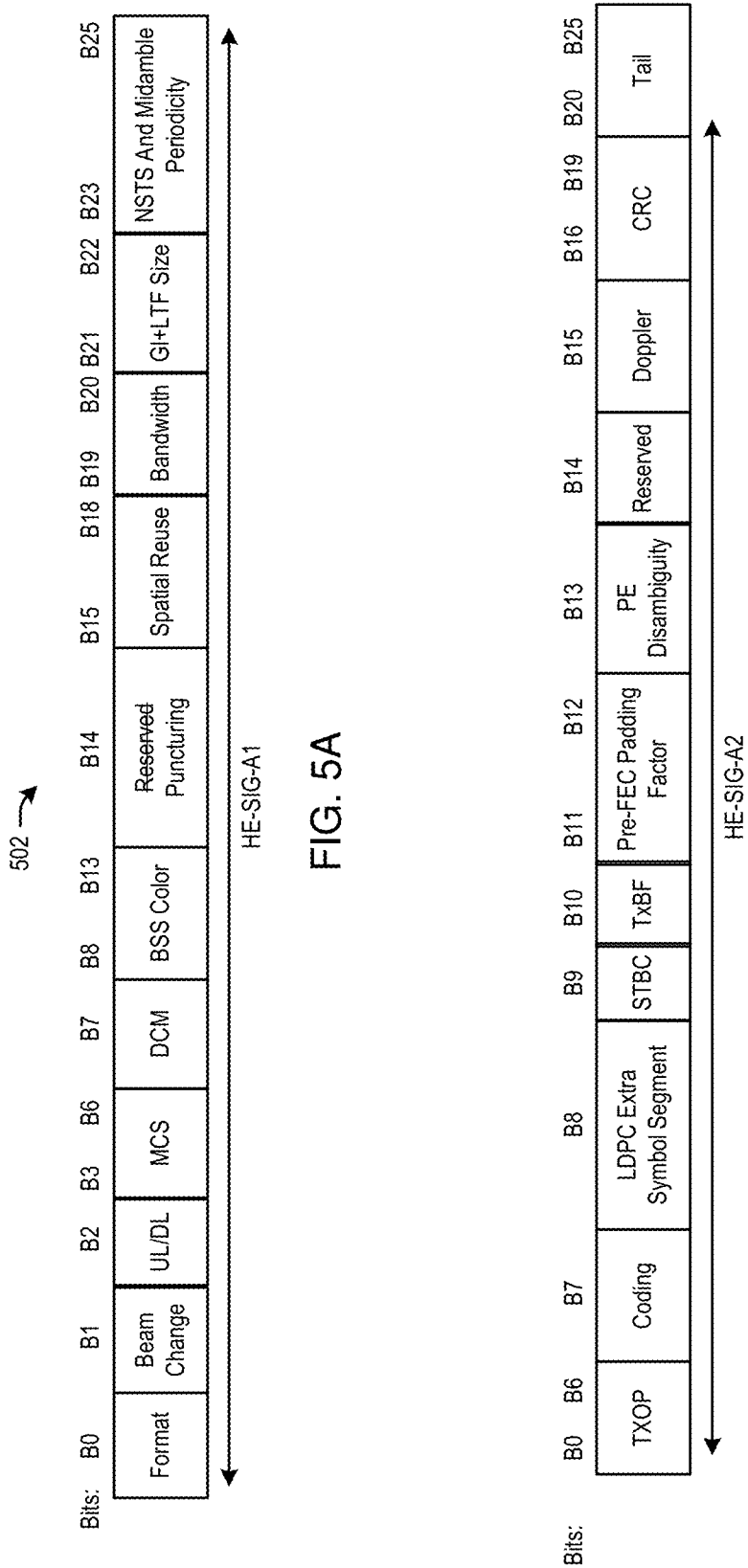
FIGS. 5A and 5B depict illustrative schematic diagrams for an HE-SIG-A frame format, in accordance with one or more example embodiments of the present disclosure.

FIGS. 5A and 5B depict illustrative schematic diagrams for an HE-SIG-A frame format, in accordance with one or more example embodiments of the present disclosure.

Referring to FIGS. 5A and 5B, there is shown a frame format for inserting quiet periods at the end of A-MPDU subframes.

The HE-SIG-A fields illustrated in FIG. 5A (showing HE-SIG-A1) and FIG. 5B (showing HE-SIG-A2) show example implementations of a new field within the A-MPDU subframe format. For example, the field that corresponds to bit 14, which was previously reserved, may be used as a 1-bit Puncturing indication bit 502. The 1-bit Puncturing indication bit 502 in the HE-SIG-A1 field of FIG. 5A may indicate whether the transmitter will operate according to the disclosure explained above. For example, if the Puncturing bit 502 is set to "1" (e.g., enabled), then the A-MPDU subframe(s) may have a quiet period at the end of that subframe. In such a scenario, the receiver may check the MPDU delimiter field to identify the presence of the quiet period for each A-MPDU subframe. If the puncturing bit 502 is set to "0" (e.g., disabled), then there will be no quiet period at the end of the A-MPDU subframe. It should be noted that the frame formats shown in FIGS. 5A-5B are examples for illustration, and such an indication field may be defined in different part of the PHY preamble and/or the Puncturing field may be part of a newly designed PHY preamble in next-generation Wi-Fi.

It is understood that the above descriptions are for purposes of illustration and are not meant to be limiting.

Figure 6:
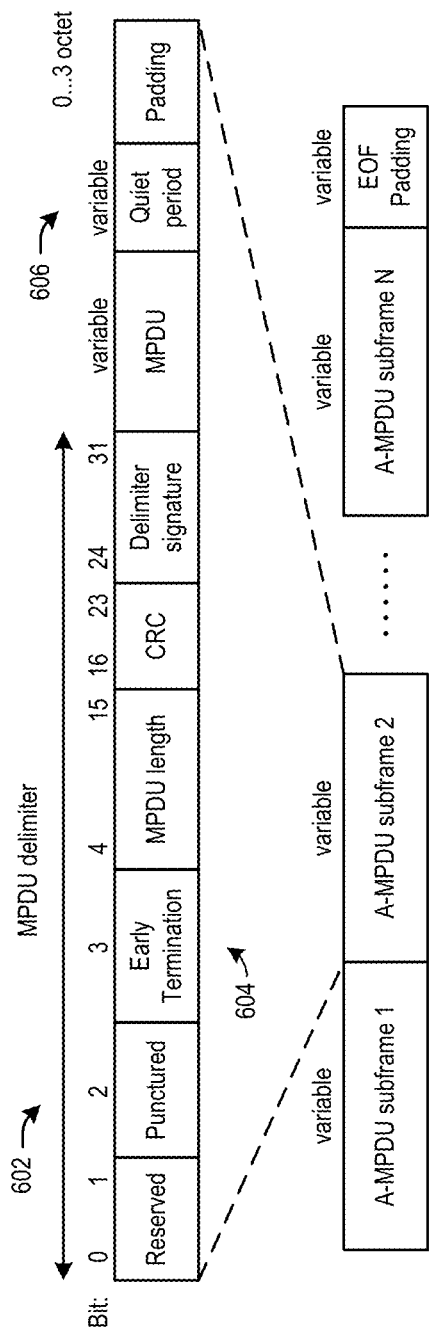
FIG. 6 depicts an illustrative schematic diagram for an aggregated media access layer protocol data unit (A-MPDU) subframe format, in accordance with one or more example embodiments of the present disclosure.

FIG. 6 depicts an illustrative schematic diagram for an A-MPDU subframe format, in accordance with one or more example embodiments of the present disclosure.

Referring to FIG. 6, there is shown an 802.11 A-MPDU frame format, which introduces the following new fields: (1) the Punctured bit 602 (1 bit) indicates whether there is a quiet period at the end of the A-MPDU subframe; (2) the Early Termination bit 604 (1 bit) indicates that the current A-MPDU subframe is at the end of the current PPDU transmission; and (3) the Quiet Period bit 606 is a variable length field during which the transmitter does not transmit data, but instead performs sensing on one or more secondary channel(s) (e.g., secondary channels 306 and/or 308 of FIG. 3). It should be noted that the detailed length of the Quiet Period 606 may be variable and that the duration of the Quiet Period 606 may be negotiated between the transmitter and the receiver (e.g., an AP and one or more STAs) as a part of their PHY/MAC Capabilities exchange during Association. It is assumed that the receiver may maintain time/frequency synchronization during the short quiet period and there may be no need to send an additional training field after the quiet period 606.

It is understood that the above descriptions are for purposes of illustration and are not meant to be limiting.

Figure 7:
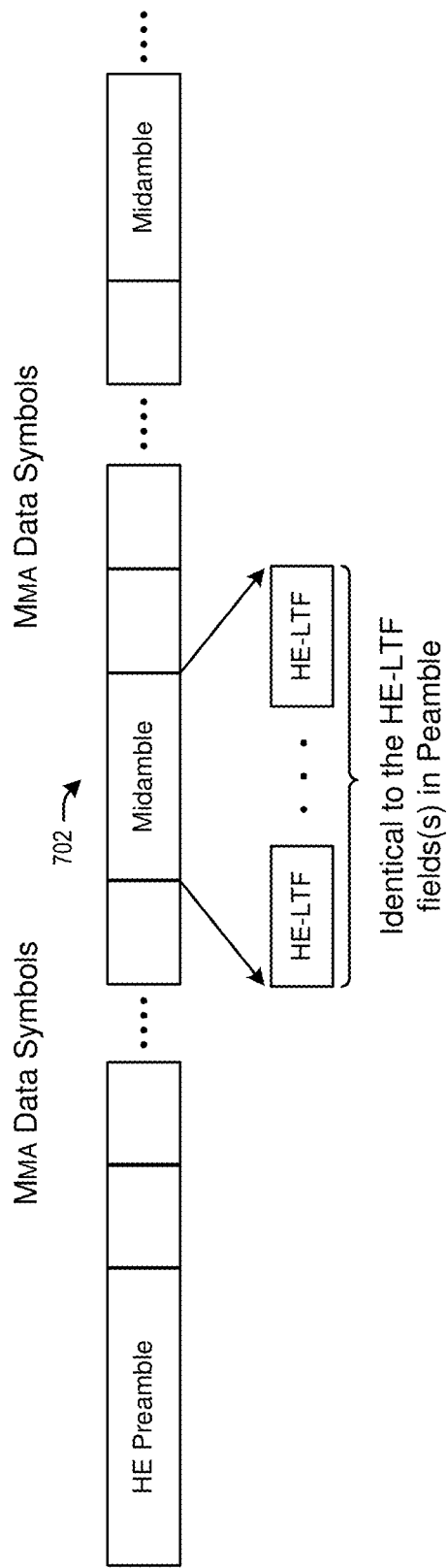
FIG. 7 depicts an illustrative schematic diagram for an HE PPDU with a midamble, in accordance with one or more example embodiments of the present disclosure.

FIG. 7 depicts an illustrative schematic diagram for an HE PPDU with a midamble, in accordance with one or more example embodiments of the present disclosure.

In one embodiment, as noted above, a dynamic channel bonding and multi-band aggregation system may facilitate inserting quiet periods once every N OFDM symbols. In other words, as an alternative to inserting quiet periods after A-MPDU subframes, the quiet periods may be inserted once every N OFDM symbols. In such a scenario, the transmitter may insert the quiet periods with a higher degree of control over the timing and/or frequency of the quiet periods with respect to the PPDU transmission (e.g., once every 10 or 20 OFDM symbols). The dynamic channel bonding and multi-band aggregation system may use the Doppler mode with midambles 702 (e.g., HE-LTFs) in 802.11ax, as shown in FIG. 7.

In one embodiment, to enable Doppler-based periodic quiet periods, the transmitter may configure the HE-SIG-A subfield as follows: (1) the Doppler bit (e.g., B15 in HE-SIG-A2, as illustrated in FIG. 5B) may be set to "1" to indicate the use of an 802.11ax Midamble (when B14 is set to "0") or quiet periods (when B14 is set to "1"); (2) a new Quiet Period bit may replace the 1-bit Reserved bit (e.g., B14 in HE-SIG-A2, as illustrated in FIG. 5B) to indicate the use of the quiet periods in the PPDU when both the "Doppler (B15)" and "Quiet Period (B14)" subfields are set to "1;" and (3) when both the "Doppler" and "Quiet Period" subfields are set to "1" (e.g., when the current subframe will be followed by a quiet period), the Midamble Periodicity bit (B25 in HE-SIG-A1) may be set to "0" if the TXVECTOR parameter QUIET_PERIODICITY is set to 10 (e.g., the quiet period will occur every 10 OFDM symbols) and the Midamble Periodicity bit (B25 in HE-SIG-A1) may be set to "1" if the TXVECTOR parameter QUIET_PERIODICITY is set to 20 (e.g., the quiet period will occur every 20 OFDM symbols). In some embodiments, the QUIET_PERIODICTY parameter may also be defined as part of TXVECTOR to indicate the periodicity of the quiet periods. The previous examples of 10 and 20 may be used, but other periodicities may also be defined using the QUIET_PERIODICITY parameter in TXVECTOR and HE-SIG-A field or other signaling fields. Note that while the 802.11ax PHY preamble and signaling fields are used as an example, new fields may be defined in the next-generation Wi-Fi standards (e.g., IEEE Extremely High Throughput (EHT)).

It is understood that the above descriptions are for purposes of illustration and are not meant to be limiting.

Figure 8:
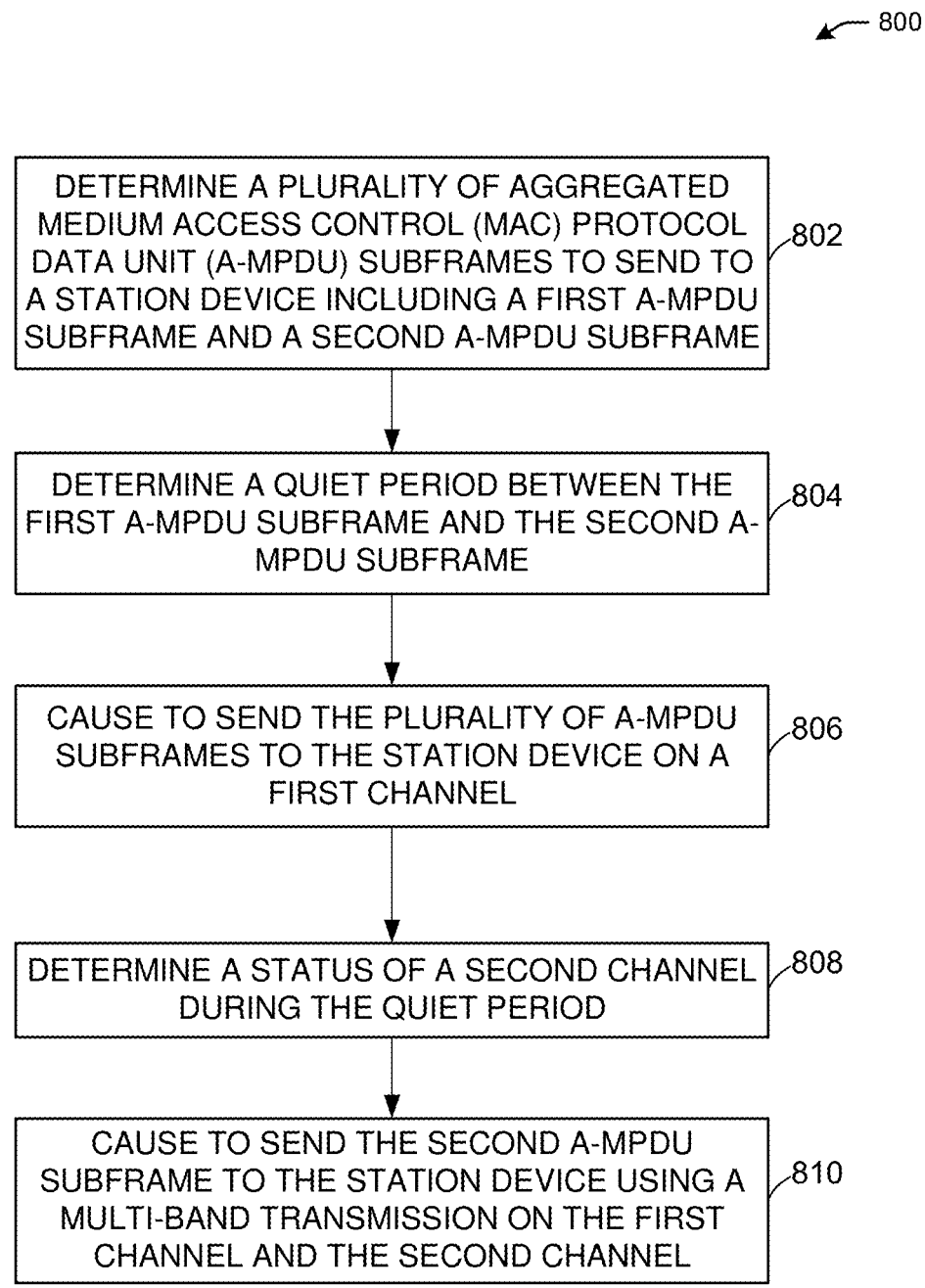
FIG. 8 illustrates a flow diagram of illustrative process for an illustrative dynamic channel bonding and multi-band aggregation system, in accordance with one or more example embodiments of the present disclosure.

FIG. 8 illustrates a flow diagram of illustrative process for an illustrative dynamic channel bonding and multi-band aggregation system, in accordance with one or more example embodiments of the present disclosure.

At block 802, a device (e.g., the user device(s) 120 and/or the AP 102 of FIG. 1) may determine a plurality of aggregated medium access control (MAC) protocol data unit (A-MPDU) subframes to send to a station device including a first A-MPDU subframe and a second A-MPDU subframe. The device may further comprise a transceiver configured to transmit and receive wireless signals. The device may further comprise one or more antennas coupled to the transceiver.

At block 804, the device may determine a quiet period between the first A-MPDU subframe and the second A-MPDU subframe. The quiet period may comprise a period of time during which the device is not transmitting on the first channel. The quiet period may be inserted after an end of a transmission of the first A-MPDU subframe or a transmission of N orthogonal frequency-division multiplexing (OFDM) symbols, wherein N is an integer. An indication of the quiet period may be included in a field of an MPDU delimiter of the first A-MPDU subframe.

At block 806, the device may cause to send the plurality of A-MPDU subframes to the station device on a first channel. The causing to send the second A-MPDU subframe may be based at least in part on the status of the second channel being determined to be idle.

At block 808, the device may determine a status of a second channel during the quiet period. The second channel may be one or more of an intra-band channel or a channel on a different band.

At block 810, the device may cause to send the second A-MPDU subframe to the station device using a multi-band transmission on the first channel and the second channel.

It is understood that the above descriptions are for purposes of illustration and are not meant to be limiting.

FIGS. 9A-9B depict illustrative schematic diagrams 900 and 950 for usable band for single user (SU) physical layer convergence protocol data unit (PPDU), in accordance with one or more example embodiments of the present disclosure.

In one embodiment, the unusable channel may be indicated in the beacon frame. For example, portions 930 and 932 may be parts of the frequency band in the 80 MHz that may be unusable due to one or more reasons. For high efficiency (HE) multi user (MU) PPDU, and HE trigger based (TB) PPDU, the disabled band could be transparent to Non-AP STA because AP does not need to schedule client on these bands. However, for SU PPDU disabled band means the resource allocation has to straddle across two frequency portions, which has been discussed in 802.11ax and disabled. In this case, the following rule should be made for SU PPDU to disable the non-contiguous resource allocation.

In one embodiment, if the beacon indicates that there is disabled subchannel (the subchannel bandwidth is TBD), the SU PPDU should only use the frequency resources of primary 20 MHz (e.g., portion 934) or Primary 40 MHz (e.g., portion 936).

In one embodiment, if a disabled band is indicated in the S20, SU PPDU could only use P20.

In one embodiment, if there is no disabled band in P40, SU PPDU could use P40. Other than these two options, SU PPDU could not be used in case of disabled band is indicated in the beacon.

Another issue of the disabled band indication is how to handle the OOB emission. For instance, if the beacon indicates that 5 MHz is disabled. The 5 MHz may only include the band occupied by the incumbent service. Based on our evaluation, 1 MHz to 2 MHz is needed to protect the incumbent service from the interference of 802.11ax.

In one embodiment, if the beacon frame indicates disabled band, an extra 1 MHz or 2 MHz should be reserved on both sides of the disabled band. The reserved band should not be used for 802.11ax transmission.

It is understood that the above descriptions are for purposes of illustration and are not meant to be limiting.

Figure 10:
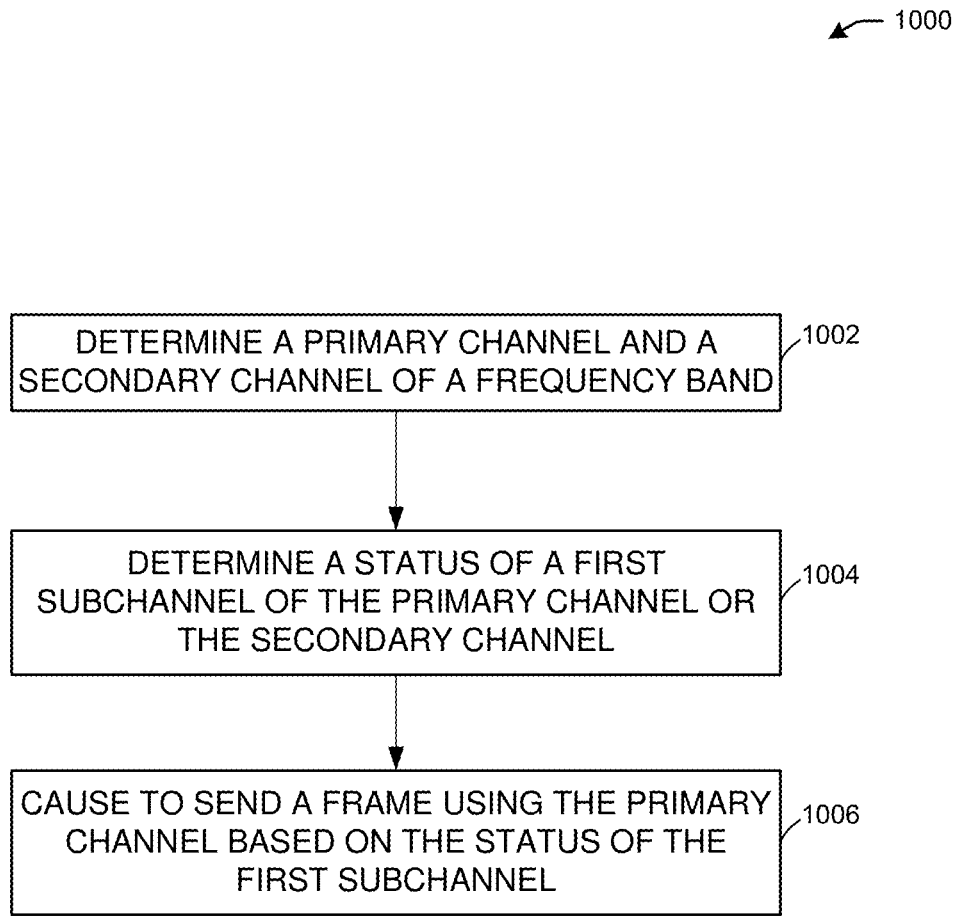
FIG. 10 illustrates a flow diagram of illustrative process for an illustrative enhanced PHY for 6 GHz disabled band system, in accordance with one or more example embodiments of the present disclosure.

FIG. 10 illustrates a flow diagram of illustrative process 1000 for an illustrative enhanced PHY for 6 GHz disabled band system, in accordance with one or more example embodiments of the present disclosure. Process 1000 may be implemented using an algorithm.

At block 1002, a device (e.g., the user device(s) 120 and/or the AP 102 of FIG. 1) may determine a primary channel and a secondary channel of a frequency band.

At block 1004, the device may determine a status of a first subchannel of the primary channel or the secondary channel.

At block 1006, the device may cause to send a frame using the primary channel based on the status of the first subchannel.

It is understood that the above descriptions are for purposes of illustration and are not meant to be limiting.

FIG. 11 shows a functional diagram of an exemplary communication station 1100 in accordance with some embodiments. In one embodiment, FIG. 11 illustrates a functional block diagram of a communication station that may be suitable for use as an AP 102 (FIG. 1) or a user device 120 (FIG. 1) in accordance with some embodiments. The communication station 1100 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1100 may include communications circuitry 1102 and a transceiver 1110 for transmitting and receiving signals to and from other communication stations using one or more antennas 1101. The communications circuitry 1102 may include circuitry that can operate the physical layer (PHY) communications and/or media access control (MAC) communications for controlling access to the wireless medium, and/or any other communications layers for transmitting and receiving signals. The communication station 1100 may also include processing circuitry 1106 and memory 1108 arranged to perform the operations described herein. In some embodiments, the communications circuitry 1102 and the processing circuitry 1106 may be configured to perform operations detailed in FIGS.1-10.

In accordance with some embodiments, the communications circuitry 1102 may be arranged to contend for a wireless medium and configure frames or packets for communicating over the wireless medium. The communications circuitry 1102 may be arranged to transmit and receive signals. The communications circuitry 1102 may also include circuitry for modulation/demodulation, upconversion/downconversion, filtering, amplification, etc. In some embodiments, the processing circuitry 1106 of the communication station 1100 may include one or more processors. In other embodiments, two or more antennas 1101 may be coupled to the communications circuitry 1102 arranged for sending and receiving signals. The memory 1108 may store information for configuring the processing circuitry 1106 to perform operations for configuring and transmitting message frames and performing the various operations described herein. The memory 1108 may include any type of memory, including non-transitory memory, for storing information in a form readable by a machine (e.g., a computer). For example, the memory 1108 may include a computer-readable storage device, read-only memory (ROM), random-access memory (RAM), magnetic disk storage media, optical storage media, flash-memory devices and other storage devices and media.

In some embodiments, the communication station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1100 may include one or more antennas 1101. The antennas 1101 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1100 may include one or more of a keyboard, a display, a non-volatile memory port, multiple antennas, a graphics processor, an application processor, speakers, and other mobile device elements. The display may be an LCD screen including a touch screen.

Although the communication station 1100 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1100 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1100 may include one or more processors and may be configured with instructions stored on a computer-readable storage device memory.

FIG. 12 illustrates a block diagram of an example of a machine 1200 or system upon which any one or more of the techniques (e.g., methodologies) discussed herein may be performed. In other embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a power management device 1232, a graphics display device 1210, an alphanumeric input device 1212 (e.g., a keyboard), and a user interface (UI) navigation device 1214 (e.g., a mouse). In an example, the graphics display device 1210, alphanumeric input device 1212, and UI navigation device 1214 may be a touch screen display. The machine 1200 may additionally include a storage device (i.e., drive unit) 1216, a signal generation device 1218 (e.g., a speaker), a dynamic channel bonding and multi-band aggregation device 1219, a network interface device/transceiver 1220 coupled to antenna(s) 1230, and one or more sensors 1228, such as a global positioning system (GPS) sensor, a compass, an accelerometer, or other sensor. The machine 1200 may include an output controller 1234, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The dynamic channel bonding and multi-band aggregation device 1219 may carry out or perform any of the operations and processes (e.g., process 800 and/or process 1000) described and shown above.

It is understood that the above are only a subset of what the dynamic channel bonding and multi-band aggregation device 1219 may be configured to perform and that other functions included throughout this disclosure may also be performed by the dynamic channel bonding and multi-band aggregation device 1219.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 1220 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1220 may include one or more physical jacks (e.g., Ethernet, coaxial, or phone jacks) or one or more antennas to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising processing circuitry coupled to storage, the processing circuitry configured to: determine a plurality of aggregated medium access control (MAC) protocol data unit (A-MPDU) subframes to send to a station device including a first A-MPDU subframe and a second A-MPDU subframe; determine a quiet period between the first A-MPDU subframe and the second A-MPDU subframe; cause to send the plurality of A-MPDU subframes to the station device on a first channel; determine a status of a second channel during the quiet period; and cause to send the second A-MPDU subframe to the station device using a multi-band transmission on the first channel and the second channel.

Example 2 may include the device of example 1 and/or some other example herein, wherein the quiet period comprises a period of time during which the device is not transmitting on the first channel.

Example 3 may include the device of example 1 and/or some other example herein, wherein the causing to send the second A-MPDU subframe is based at least in part on the status of the second channel being determined to be idle.

Example 4 may include the device of example 1 and/or some other example herein, wherein the second channel is one or more of an intra-band channel or a channel on a different band.

Example 5 may include the device of example 1 and/or some other example herein, wherein the quiet period is inserted after an end of a transmission of the first A-MPDU subframe or a transmission of N orthogonal frequency-division multiplexing (OFDM) symbols, wherein N is an integer.

Example 6 may include the device of example 1 and/or some other example herein, wherein an indication of the quiet period is included in a field of an MPDU delimiter of the first A-MPDU subframe.

Example 7 may include the device of example 1 and/or some other example herein, further comprising a transceiver configured to transmit and receive wireless signals.

Example 8 may include the device of example 7 and/or some other example herein, further comprising one or more antennas coupled to the transceiver.

Example 9 may include a non-transitory computer-readable medium storing computer-executable instructions which when executed by one or more processors result in performing operations comprising: determining a plurality of aggregated medium access control (MAC) protocol data unit (A-MPDU) subframes to send to a station device including a first A-MPDU subframe and a second A-MPDU subframe; determining a quiet period between the first A-MPDU subframe and the second A-MPDU subframe; causing to send the plurality of A-MPDU subframes to the station device on a first channel; detecting a status of a second channel during the quiet period; and causing to send the second A-MPDU subframe to the station device using a multi-band transmission on the first channel and the second channel.

Example 10 may include the non-transitory computer-readable medium of example 9 and/or some other example herein, wherein the quiet period comprises a period of time during which the device is not transmitting on the first channel.

Example 11 may include the non-transitory computer-readable medium of example 9 and/or some other example herein, wherein the causing to send the second A-MPDU subframe is based at least in part on the status of the second channel being determined to be idle.

Example 12 may include the non-transitory computer-readable medium of example 9 and/or some other example herein, wherein the second channel is one or more of an intra-band channel or a channel on a different band.

Example 13 may include the non-transitory computer-readable medium of example 9 and/or some other example herein, wherein the quiet period is inserted after an end of a transmission of the first A-MPDU subframe or a transmission of N orthogonal frequency-division multiplexing (OFDM) symbols, wherein N is an integer.

Example 14 may include the non-transitory computer-readable medium of example 9 and/or some other example herein, wherein an indication of the quiet period is included in a field of an MPDU delimiter of the first A-MPDU subframe.

Example 15 may include a method comprising: determining a plurality of aggregated medium access control (MAC) protocol data unit (A-MPDU) subframes to send to a station device including a first A-MPDU subframe and a second A-MPDU subframe; determining a quiet period between the first A-MPDU subframe and the second A-MPDU subframe; causing to send the plurality of A-MPDU subframes to the station device on a first channel; detecting a status of a second channel during the quiet period; and causing to send the second A-MPDU subframe to the station device using a multi-band transmission on the first channel and the second channel.

Example 16 may include the method of example 15 and/or some other example herein, wherein the quiet period comprises a period of time during which the device is not transmitting on the first channel.

Example 17 may include the method of example 15 and/or some other example herein, wherein the causing to send the second A-MPDU subframe is based at least in part on the status of the second channel being determined to be idle.

Example 18 may include the method of example 15 and/or some other example herein, wherein the second channel is one or more of an intra-band channel or a channel on a different band.

Example 19 may include the method of example 15 and/or some other example herein, wherein the quiet period is inserted after an end of a transmission of the first A-MPDU subframe or a transmission of N orthogonal frequency-division multiplexing (OFDM) symbols, wherein N is an integer.

Example 20 may include the method of example 1 and/or some other example herein, wherein an indication of the quiet period is included in a field of an MPDU delimiter of the first A-MPDU subframe.

Example 21 may include an apparatus comprising means for: determining a plurality of aggregated medium access control (MAC) protocol data unit (A-MPDU) subframes to send to a station device including a first A-MPDU subframe and a second A-MPDU subframe; determining a quiet period between the first A-MPDU subframe and the second A-MPDU subframe; causing to send the plurality of A-MPDU subframes to the station device on a first channel; detecting a status of a second channel during the quiet period; and causing to send the second A-MPDU subframe to the station device using a multi-band transmission on the first channel and the second channel.

Example 22 may include the apparatus of example 21 and/or some other example herein, wherein the quiet period comprises a period of time during which the device is not transmitting on the first channel.

Example 23 may include the apparatus of example 21 and/or some other example herein, wherein the causing to send the second A-MPDU subframe is based at least in part on the status of the second channel being determined to be idle.

Example 24 may include the apparatus of example 21 and/or some other example herein, wherein the second channel is one or more of an intra-band channel or a channel on a different band.

Example 25 may include the apparatus of example 21 and/or some other example herein, wherein the quiet period is inserted after an end of a transmission of the first A-MPDU subframe or a transmission of N orthogonal frequency-division multiplexing (OFDM) symbols, wherein N is an integer.

Example 26 may include the apparatus of example 1 and/or some other example herein, wherein the processing circuitry may be further configured to perform asynchronous dynamic channel bonding with the secondary channel.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a plurality of aggregated medium access control (MAC) protocol data unit (A-MPDU) subframes to send to a station device including a first A-MPDU subframe and a second A-MPDU subframe;
   determine a quiet period between the first A-MPDU subframe and the second A-MPDU subframe;
   cause to send the plurality of A-MPDU subframes to the station device on a first channel;
   determine a status of a second channel during the quiet period; and
   cause to send the second A-MPDU subframe to the station device using a multi-band transmission on the first channel and the second channel.

2. The device of claim 1, wherein the quiet period comprises a period of time during which the device is not transmitting on the first channel.

3. The device of claim 1, wherein the causing to send the second A-MPDU subframe is based at least in part on the status of the second channel being determined to be idle.

4. The device of claim 1, wherein the second channel is one or more of an intra-band channel or a channel on a different band.

5. The device of claim 1, wherein the quiet period is inserted after an end of a transmission of the first A-MPDU subframe or a transmission of N orthogonal frequency-division multiplexing (OFDM) symbols, wherein N is an integer.

6. The device of claim 1, wherein an indication of the quiet period is included in a field of an MPDU delimiter of the first A-MPDU subframe.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
   determining a plurality of aggregated medium access control (MAC) protocol data unit (A-MPDU) subframes to send to a station device including a first A-MPDU subframe and a second A-MPDU subframe;
   determining a quiet period between the first A-MPDU subframe and the second A-MPDU subframe;
   causing to send the plurality of A-MPDU subframes to the station device on a first channel;
   detecting a status of a second channel during the quiet period; and
   causing to send the second A-MPDU subframe to the station device using a multi-band transmission on the first channel and the second channel.

10. The non-transitory computer-readable medium of claim 9, wherein the quiet period comprises a period of time during which the device is not transmitting on the first channel.

11. The non-transitory computer-readable medium of claim 9, wherein the causing to send the second A-MPDU subframe is based at least in part on the status of the second channel being determined to be idle.

12. The non-transitory computer-readable medium of claim 9, wherein the second channel is one or more of an intra-band channel or a channel on a different band.

13. The non-transitory computer-readable medium of claim 9, wherein the quiet period is inserted after an end of a transmission of the first A-MPDU subframe or a transmission of N orthogonal frequency-division multiplexing (OFDM) symbols, wherein N is an integer.

14. The non-transitory computer-readable medium of claim 9, wherein an indication of the quiet period is included in a field of an MPDU delimiter of the first A-MPDU subframe.

15. A method comprising:
- determining a plurality of aggregated medium access control (MAC) protocol data unit (A-MPDU) subframes to send to a station device including a first A-MPDU subframe and a second A-MPDU subframe;
- determining a quiet period between the first A-MPDU subframe and the second A-MPDU subframe;
- causing to send the plurality of A-MPDU subframes to the station device on a first channel;
- detecting a status of a second channel during the quiet period; and
- causing to send the second A-MPDU subframe to the station device using a multi-band transmission on the first channel and the second channel.

16. The method of claim 15, wherein the quiet period comprises a period of time during which the device is not transmitting on the first channel.

17. The method of claim 15, wherein the causing to send the second A-MPDU subframe is based at least in part on the status of the second channel being determined to be idle.

18. The method of claim 15, wherein the second channel is one or more of an intra-band channel or a channel on a different band.

19. The method of claim 15, wherein the quiet period is inserted after an end of a transmission of the first A-MPDU subframe or a transmission of N orthogonal frequency-division multiplexing (OFDM) symbols, wherein N is an integer.

20. The method of claim 15, wherein an indication of the quiet period is included in a field of an MPDU delimiter of the first A-MPDU subframe.

* * * * *